United States Patent
Helsell

[15] 3,650,343
[45] Mar. 21, 1972

[54] SKI SLOPE TRAVERSING AND CONDITIONING VEHICLE

[72] Inventor: John B. Helsell, 4601-91st Place, N. E., Bellevue, Wash. 98004

[22] Filed: Mar. 12, 1970

[21] Appl. No.: 18,907

[52] U.S. Cl. .................................... 180/5 R, 37/10, 180/9.4, 180/50
[51] Int. Cl. ................................. B62d 11/20, B62m 27/02
[58] Field of Search ..................... 180/5, 14, 50, 52, 9.44; 37/10

[56] References Cited

UNITED STATES PATENTS

| | | | |
|---|---|---|---|
| 3,451,494 | 6/1969 | Kowalik | 180/9.44 X |
| 3,319,936 | 5/1967 | Askins | 180/51 X |
| 3,443,654 | 5/1969 | Schoonover | 180/9.44 X |
| 2,933,143 | 4/1960 | Robinson | 180/14 |
| 3,368,292 | 2/1968 | Prinoth | 180/5 X |

Primary Examiner—Richard J. Johnson
Attorney—Christensen & Sanborn

[57] ABSTRACT

An articulated multi-unit track-type vehicle is disclosed for traversal, packing and leveling of snow on a ski slope and similar applications. The interconnected, relatively wide and narrow units of the special-purpose vehicle are structurally constrained by their coupling against relative pitch and relative roll motion while being permitted relative yaw motion. Relative angular positioning of the units in the yaw plane is produced directly by hydraulic jacks or equivalent means to effect steering of the vehicle without reliance on track slippage therefor. By reason of constraint of the units to monoplanar relative motion combined with the means to steer, the vehicle can be maneuvered safely and in controlled manner on steep slopes, and can be made to climb steeper grades and to level out moguls more effectively than conventional vehicles.

8 Claims, 7 Drawing Figures

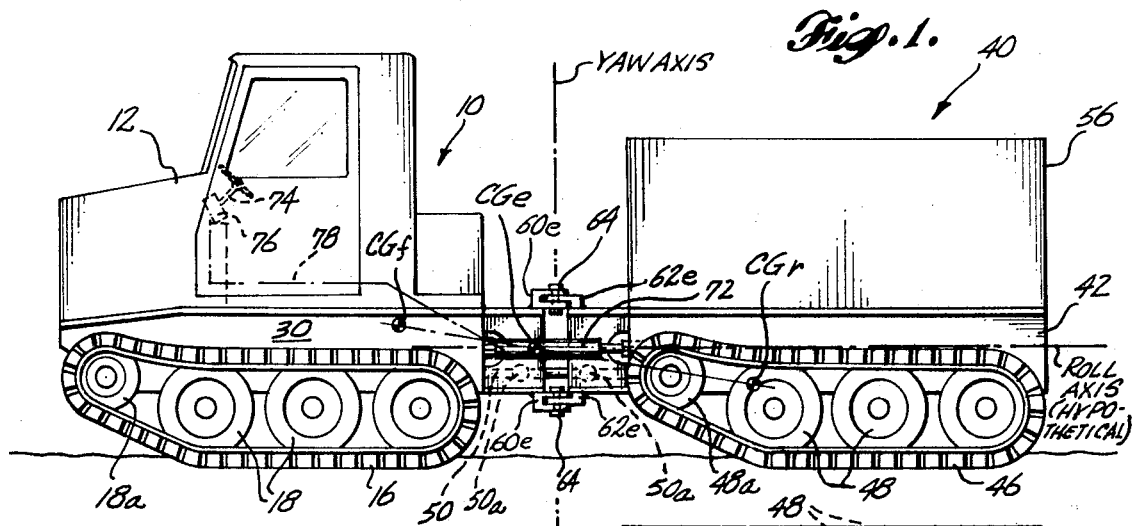
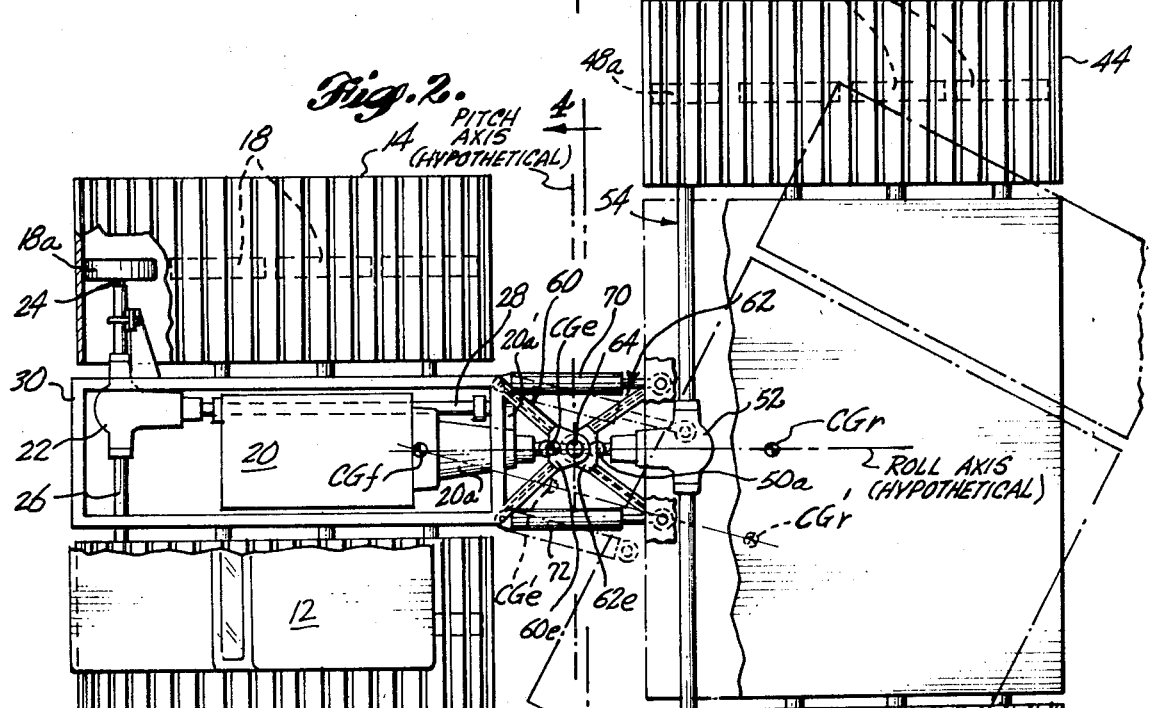
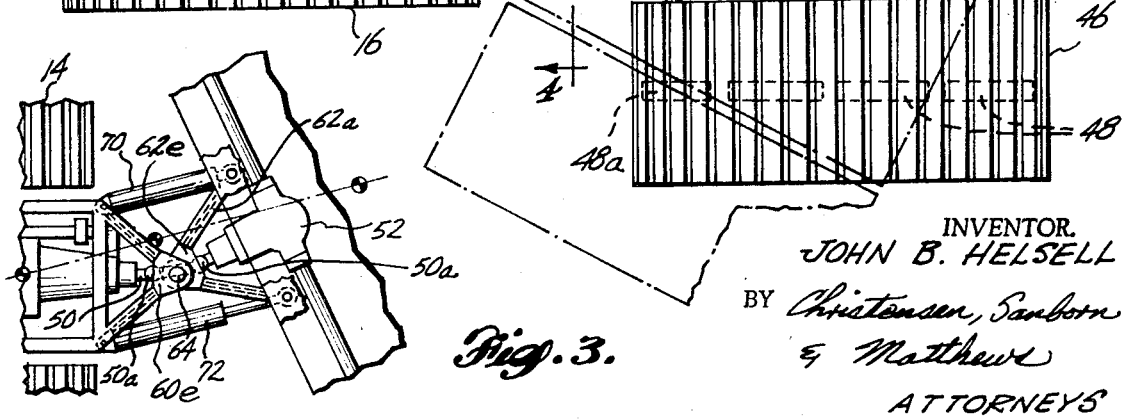

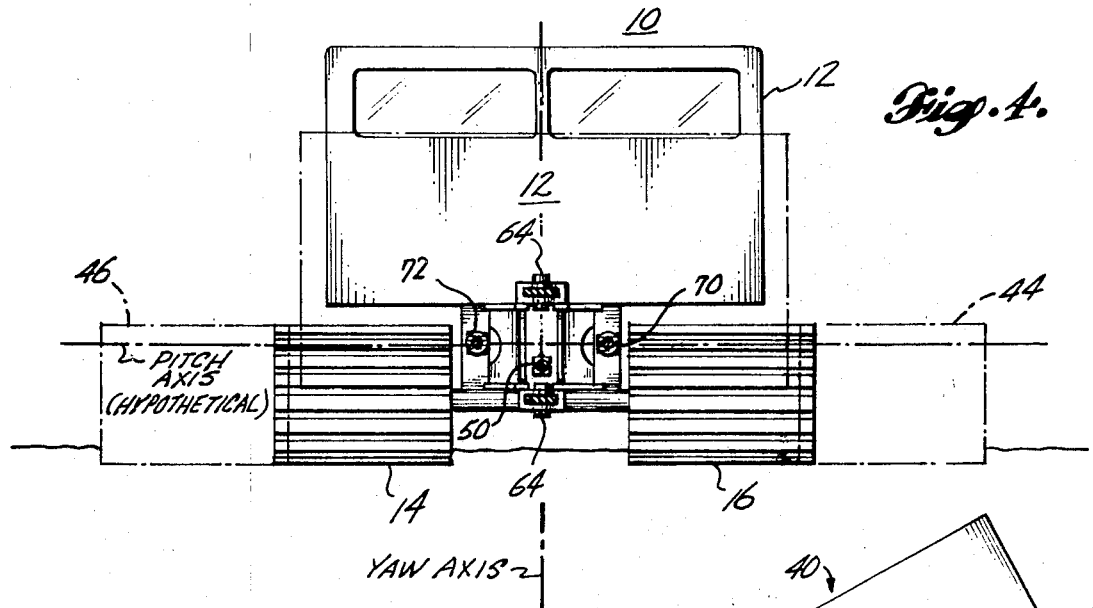
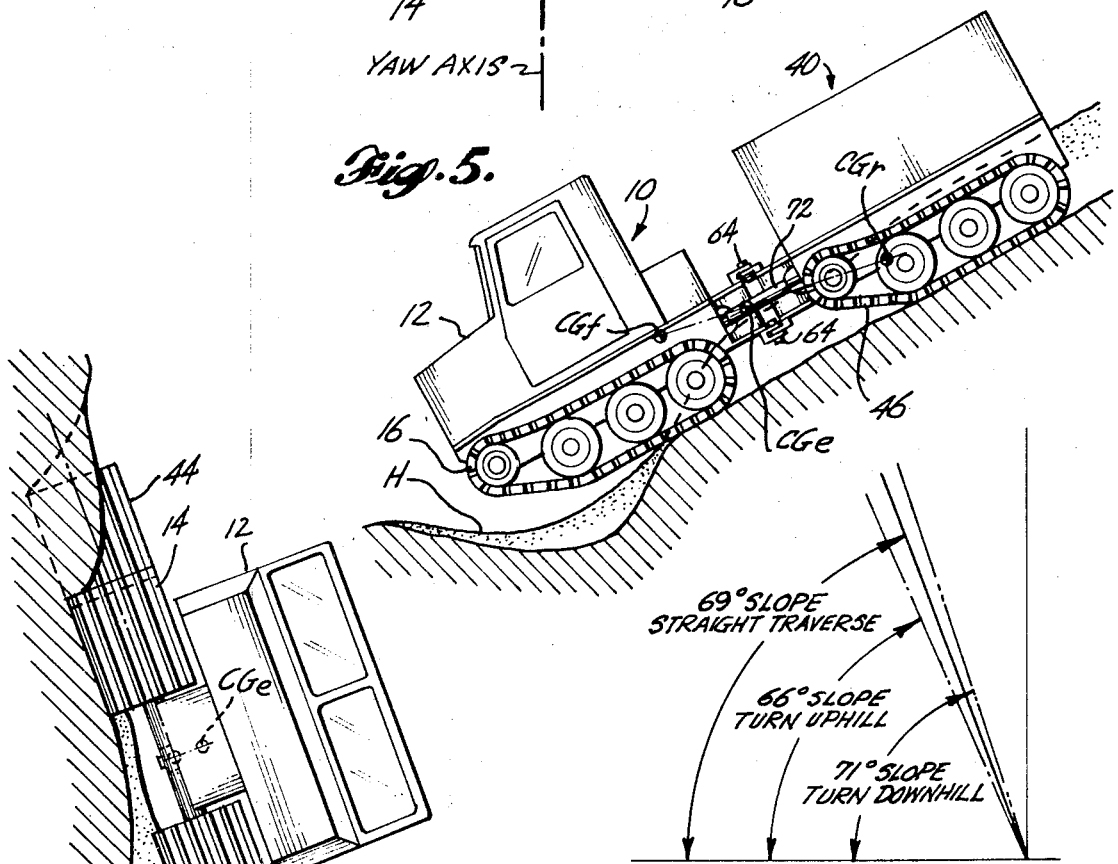

SKI SLOPE TRAVERSING AND CONDITIONING VEHICLE

DESCRIPTION

This invention relates to improvements in crawler or track-type multi-unit articulatively coupled vehicles such as may be used in traversing and conditioning ski slopes or in moving over other low-shear ground media such as swampy or sandy regions. A broad object hereof is to devise an improved vehicle of this nature the preferred embodiment of which is herein illustratively described; however, it will be recognized that certain modifications and changes therein with respect to details may be made without departing from the essential features involved.

In order to maintain a ski slope in usable or optimum condition it is necessary at intervals for resort operators to groom the surface by running over it with heavy track-type vehicles, sometimes towing rollers or scrapers to achieve the needed leveling. Many of these ski areas extend over hundreds, even thousands of acres, parts of which are precipitously steep, often badly mogulled requiring leveling, or covered with fresh snow requiring packing. The vehicle needed for this purpose ideally should be easily maneuverable, fast, stable, with a low center of gravity, reliably controllable on a steep slope, and capable of great tractive effort so as to be able to climb, descend and traverse very steep and often irregular slopes. It should be capable of packing soft snow over a wide path on each run, and effective to scrape off and level out the moguls which develop to spoil a slope after some period of use. The need for a satisfactory vehicle with these capabilities has grown with the rapid development of the recreational skiing industry.

A broad object of the present invention is to provide an improved snow vehicle constituted so as to more closely approach the above-described ideal functioning than types heretofore available. A specific object hereof is to devise such a vehicle which for a given overall length is more effective to level the snow, more stable on varying slopes, more reliably controllable, and more maneuverable on steep slopes than prior type vehicles for the purpose. Moreover the invention provides a vehicle which combines the high-speed ride characteristics of a relatively long vehicle with the steering control of a conventional four-track vehicle with steering effected by direct articulation of the front and rear units.

A further object hereof is to provide a special-purpose multi-unit articulated tractor vehicle of this nature, the connecting joint, associated frame structures and steering means of which are so constituted and so functionally interrelated as to achieve not only greater efficiency in the ski-slope grooming and leveling action of the vehicle, but also to provide a simpler construction, reduced manufacturing and servicing costs, and added inherent stability and controllability in operating on steep and uneven terrain under the widely varying conditions usually encountered. It is also an object to achieve improved climbing ability by reduction of the digging-in tendency caused by track slippage.

A further and more specific object is to provide such a multi-unit vehicle having one unit with tracks spaced apart farther than the outer edges of the track means (usually one wide track or two spaced-apart narrower tracks) of the other unit so as to pack snow in contiguously adjacent paths, and with the units so interconnected that the wider unit imparts stability to the narrower of the units and thereby to the vehicle as a whole. Moreover, the interconnecting coupling and direct yaw-producing steering means permitting controlled jackknifing of the units when traversing steep side slopes affords definite and reliable steering control (not attainable with units that rely upon track slippage for steering) and provides an emergency measure against sidewise tipping when needed.

Another object of the invention is to devise a snowmobile of the articulated multi-unit track type which may be manufactured with commercially available equipment and components for the most part and which as a whole is less expensive and simpler to manufacture than other previously available equipment intended for similar usage.

In characterizing the invention, it may be noted that in most, if not all, prior multi-unit track-type snow vehicles the driven front and rear units were articulatively coupled by a universal joint allowing relative motion of the units about all three axes, vertical, longitudinal and horizontal. The purpose of such freedom of relative motion in all planes was to reduce frame structure stresses and to achieve uniform pressure distribution of the tracks on the ground or snow and thereby attain maximum tractive effort from both units. The present invention, however, interconnects the relatively wide and narrow power-driven tractor units by a coupling which is structurally rigid (i.e., prevents relative motion between the units) about hypothetical pitch and roll axes while permitting freedom of motion about an upright axis, i.e., in the yaw plane, which is the steering plane or the plane of the tracks. A number of unique advantages and benefits are derived from this coupling arrangement in the special-purpose application described, as have already been alluded to and as will more fully appear as the description proceeds. In accordance with this invention, the design of the units may vary and the wider of the two units may be either the front unit or the rear unit, whereas either or both units may carry an engine for drive purposes if desired. Moreover, a power transmission may be used to interconnect the tractor sections of the respective units. Various steering mechanisms may also be used in lieu of hydraulic jacks within the scope of the invention as viewed broadly.

These and other features, aspects and advantages of the invention will become more fully evident from the following description thereof by reference to the accompanying drawings.

FIG. 1 is a side elevation of the preferred embodiment.

FIG. 2 is a simplified plan view thereof with parts broken away for clarity of illustration, and showing by dot-dash lines the rear unit angled in yaw to the longitudinal axis of the front unit by the steering means.

FIG. 3 is a top detail view showing the coupling, steering and power transmission means interconnecting the two units of the vehicle, the units being shown fragmentarily and turned into an opposite angular relationship than that shown in FIG. 2.

FIG. 4 is a transverse sectional view taken on line 4—4 in FIG. 2.

FIG. 5 is a side elevation view of the vehicle descending a hill with uneven slope and illustrating the stabilizing and leveling effect of the vehicle under one set of conditions.

FIG. 6 is a front view of the vehicle traversing a very steep and uneven slope to illustrate certain effects related to stability, leveling action and safe maneuverability of the vehicle under such conditions.

FIG. 7 is a diagram illustrating critical slope angles of the vehicle in a slope traverse position postulating the center-of-gravity positions depicted in FIGS. 1, 2, 3, 5 and 6.

Referring to the drawings, the illustrated front vehicle unit 10 comprises a cab 12, a pair of transversely spaced, cleated, band-type crawler tracks 14 and 16 guided in a suitable or conventional manner on wheels or sheaves 18. The front wheels 18a, comprising sprockets which engage the track grousers for positive drive purposes, are power driven by an engine 20 and are smaller than the others and raised in position so as to incline or ramp the forward portions of the lower stretches of tracks 14 and 16. The drive for wheels 18a extends through a differential gear system 22 and axles 24 and 26 supported in journal tubes appropriately shackled to the vehicle unit frame 30. In order to deliver the drive power from the engine 20 to the differential gear train 22 there is a longitudinally extending drive shaft 28 connecting the main gear of the differential with the engine transmission gear system 20a which, for this purpose, has an auxiliary side takeoff gear assembly within the housing 20a'. As will later appear the transmission 20a also has a second output in the form of shaft 50 which has two universal joints therein designed to transmit drive power to the tracks of the rear unit 40 at uniform angular velocity. Suitable gear-shifting mechanism, brake controls and engine controls are located conveniently within the cab 12 and are not specifically illustrated because they are or may be of conventional design following practices standard to the truck and heavy equipment industry.

In this example the front tractor unit 10 is the narrower of the two units in terms of the spacing between the tracks 14 and 16. The center of gravity $CG_f$ of the front unit 10 is marked in side elevation in FIGS. 1 and 5, and in plan view in FIGS. 2 and 3. By separating the tracks 14 and 16 sufficiently to accommodate the engine in the space between them at a relatively low position the center of gravity $CG_f$ is kept low to the ground. The engine mounting arrangement is not depicted in detail but it will be understood that any suitable or conventional mounting structure may be employed to support the engine and transmission assembly within the vehicle frame 30, preferably of deep rigid boxlike configuration, and that the cab and other associated parts of the vehicle are also suitably mounted or suspended thereon according to practical or conventional design considerations the specifics of which are not here important. While the frame structure design may vary, it is important for purposes of the invention that it be capable of withstanding torsional loading about the longitudinal axis as imposed by the coupling to the rear unit and that it provide a rigid and adequately deep structural support also for the coupling tongue against vertical deflection loading. Thereby the combined frame and tongue can serve to maintain the front unit 10 in coplanar relationship at all times with the rear unit 40 against transverse torsional rocking and pitch plane bending deflection loads acting differentially on the units as they move over uneven terrain.

The rear vehicle unit 40 has a deep rigid boxlike frame structure 42 similar to that of the front unit and mounts crawler tracks 44,46 similar to the tracks on the front unit but spaced apart more widely such that their inner edges are aligned with or slightly overlap the track paths of the forward vehicle unit and thereby bear on the snow in respective paths contiguous to the paths of the front unit tracks. This concept of relatively offset front and rear unit tracks maximizing the composite ground area packed by a tandem unit vehicle is per se old in the art. The rear unit tracks 44 and 46 are guided on wheels 48 with a front pair of sprockets 48a which guide and drivingly engage the tracks 44 and 46.

As previously stated, drive power from the engine transmission 20a is transmitted aft to the sprockets 48a by way of an articulated drive shaft 50 incorporating double universal joints 50a arranged to transmit uniform angular velocity. This shaft ends in the input of a differential gear system 52 coupled by branch shafts in the usual manner through shafts 54 to the sprockets 48a. As in the front unit the drive wheels 48a are elevated and of smaller size than the guide wheels 48 so as to ramp upward the lower forward stretch of tracks 44 and 46.

The rear unit 40 in this case is shown as having no engine of its own but is driven entirely by power from the engine 20 mounted in the front vehicle unit. It will be evident, however, that the rear vehicle unit may incorporate its own separate drive engine or alternatively a hydraulic or electric motor arranged to be energized by a pump or generator driven by the engine of the other unit and connected to apply motive power to the crawler tracks 44 and 46. Suitable engine drives, pump and motor drives, and generator and motor drives that may be used for the purpose are well known in various vehicle applications and require no separate description or illustration herein. Preferably each of the differentials 22 and 52 is of a "nonslip" type, i.e., has frictional clutches in each side so that both sides will be driven by input power to the differential except when differential loading on the track exceeds a predetermined value determined by clutch friction, at which time differential drive speed occurs. In the example, the rear vehicle unit has a container box 56 which can serve to carry equipment or supplies or which alternatively can be used to carry weights if desired to weight it down and provide additional packing force on the snow. In the illustrated case the center of gravity for the rear vehicle unit is marked at the location $CG_r$ for a representative design both in the side view of FIG. 1 and in the plan view of FIG. 2. The composite or effective center of gravity for the total vehicle comprising both front and rear units is shown at location $CG_c$ intermediate the individual unit center-of-gravity points.

Mounted centrally and projecting rearwardly from the aft end of the forward vehicle unit frame structure 30 is a tongue structure 60 comprising rearwardly convergent structural beam members joined together at their rear extremities top and bottom by gusset plates 60e to form a rigid triangular box with the rearward end structure of the main frame 30. A similar triangular boxlike structure 62 comprising beam members forwardly convergent and joined together by gusset plates 62e project forwardly and are mounted rigidly on the forward end wall of the frame structure 42 of the rear vehicle unit 40. The two tongues are pivotally interconnected at top and bottom by vertically aligned pivot pins 64 passed through aligned apertures in coupler fittings 60e of forward tongue 60 and coupler fittings 62e of rearward tongue 62. The two vertically spaced pivot pins 64 interconnecting the respective vehicle unit tongues provide a rigid coupling between the units maintaining their snow-engaging track surfaces in substantially coplanar alignment at all times while permitting relative yawing motion as between the units for steering purposes. The rigid tongue structures integrated with the frame structures of the respective units and the vertically spaced (i.e., torsion and bending-resistant) means by which they are pivotally interconnected so as to constrain the units to relative motion in a common steering (generally horizontal) plane has important advantages as alluded to previously and as will hereinafter be explained more fully. The advantageous simplicity and structural integrity of such a coupling, and the associated convenience of providing an open central space at a convenient height between the top and bottom sets of gusset plates through which to transmit drive power by way of drive shaft 50 should be noted.

Control of the vehicle for purposes of directional control as well as for purposes of increasing its ground-engaging width for augmenting stability against tipping over sidewise on steep slopes, when desired, is accomplished by means of the pair of hydraulic jacks 70 and 72. These jacks are differentially controlled in extension and retraction by means of a hydraulic system the details of which are not shown but the presence of which is illustrated schematically in FIG. 1 by the steering wheel 74 in the cab, the valve mechanism 76 controlled by such wheel, and hydraulic lines 78 extending between the valve mechanism and the jacks. The vehicle, of course, will include a suitable hydraulic pressure source (not shown) with a pump driven by the engine 20 in the usual manner in order to operate the hydraulic jacks and any other hydraulic systems incorporated in the vehicle. Extending the length of one of the jacks while contracting or shortening the other jack causes abrupt angular relative yawing movement between the front and rear units 10 and 40 about the common axis of the pivot pins 64 such as from the solid line position to the broken line position shown in FIG. 2. Such movement effected by the large forces easily generated through the hydraulic jacks readily shifts the angular position of the two units, particularly when it is considered that the vehicle is operated on snow or other low-shear strength ground media having no great resistance to movement of this nature. When steering forces are applied by the jacks, both units will typically move in some degree about an axis parallel to the pivot pins 64. The response is quick and is readily controlled or metered by use of well-known or conventional techniques of hydraulic system design.

With conventional two-track snowmobiles both control over steering and hill climbing ability are adversely affected by track slippage, yet as with the present vehicle it is track slippage that is primarily relied upon to level out the moguls in grooming a packed ski slope. With conventional vehicles track slippage is relied upon for steering, but with the tracks already slipping in varying and indefinite manner in performing the primary work of the vehicle, steering control becomes indefinite and unreliable, and in some situations can be lost altogether. Also, when such vehicles are climbing, the units create their own added increment of slope to be climbed by the trenches being dug by their slipping tracks, i.e., makes the slope angle effectively steeper by forcing the vehicle to climb out of its own trenches. A conventional four-track unit with steering by yaw control overcomes the effect of slippage on steering control. However, it does little to improve the hill climbing ability. With equally spaced tracks on the front and rear units and freedom of the units to move relatively in pitch about their coupling, the front end of the rear unit is depressed in the trenches of the front unit, hence is incapable of supporting the rear of the front unit. With the present vehicle, however, the units mutually support each other because of rigidity of their coupling in the pitch plane and the fact that the rear unit is not forced to travel in the trenches formed by the front unit.

Other advantages also flow from these combined features. Thus, with the units constrained to "float" on the snow in a common plane under all conditions they are not free to dig their own separate slope increments during hill climbing or to tip or pitch uncontrollably, i.e., independently of each other, on uneven terrain. Moreover, each unit is constrained by the coupling to contribute to the stability of the other on any slope. The high-speed ride characteristics are also improved because the effective wheel base length is the combined lengths of the units. With the units constrained to a common plane of relative motion, the vehicle does a highly effective leveling job on packed slopes by scraping and on new snow by compaction, and with the tracks offset the path that is leveled can be much wider than with conventional vehicles.

It is of interest to note in FIG. 2 that relative yawing or jackknifing motion between the units effected by the steering jacks produces a lateral shift in the position of the effective vehicle center of gravity $CG_e$ to a position $CG_e'$ in the direction of the included angle formed between the nonaligned units. Thus, in case the vehicle is traversing a steep sidehill, as shown in FIG. 6, with the units aligned and there is a sudden need to regain stability against tipping over downhill, actuation of the steering jacks to effect a relative yaw or jackknifing of the vehicle units in a sense to execute a downhill turn will cause some lateral shifting of the center of gravity in the downhill sense. It might at first be thought that this would aggravate the tendency to tip over by gravity action. However, it is found that the effect of this center-of-gravity shift is more than offset by the accompanying increase in effective width of the base of the vehicle bearing on the snow. Moreover, because the steering action may be made to occur quickly, before the overturning moment of gravity can overcome inertia and start tipping the vehicle appreciably, its forward driving motion will have carried it into a downhill turn initiated to take advantage of the greater stability afforded by orienting the length of the vehicle downhill.

In FIG. 6 the center of gravity $CG_e$ is shown located on the uphill side of a vertical line L representing the assumed effective bearing or fulcrum line defined by the downhill edge portions of the tracks bearing into the snow. This effective tipping fulcrum line for the vehicle could be determined empirically from case to case depending on snow condition, surface irregularities, etc. However, to a first approximation it may be regarded as situated between the extended lines of the outer or downhill edges of the downhill tracks of the front and rear vehicle units. Representative critical angles for overturning of the illustrative vehicle on a side slope in a horizontal traverse by gravity under standing conditions are shown in FIG. 7, assuming the design proportions and the center-of-gravity locations depicted approximately as in the other drawing figures. Thus, with the vehicle units aligned in a straight traverse the vehicle is at the critical point of overturning on a 69° slope. With the vehicle jackknifed so as to execute an uphill turn, the safe slope angle becomes smaller, namely 66°, whereas with the vehicle units yawed relatively to execute a downhill turn, it will be seen that the safe slope angle increases to 71°. This, therefore, provides a means of adding dynamically to the inherently high degree of overturning stability by which through torsional stiffness of the joint the wider unit imparts its stability to the narrower one.

In FIG. 5 the vehicle is executing a downhill run and it will be seen that the snow is being leveled by the tracks and that the antibending rigidity of the coupling between the front and rear units is preventing the nose of the front unit from dropping down into the hollow H. Instead the rear portion of the front unit and the rear unit itself continue to bear down hard on the higher levels of snow and, therefore, tend to compact that snow to the level of the hollow H.

When the improved vehicle is run over a ski slope one or more times, a very effective job is done to groom and level the slope. The vehicle may be used if desired to carry a crane or other working equipment so as to service the towers of ski lift apparatus and to perform other tasks in a snow resort area. Added advantages of simplified construction and low cost of manufacture are also realized as a result of utilizing the simple monoplanar articulative coupling system relied upon to achieve the special operating advantages described.

What is claimed is:

1. A snow-traversing vehicle for use on ski slopes and the like comprising front and rear units having driven ground-engaging traction means each with ground-engaging tracks extending substantially linearly along at least the major portion of the length of the associated unit with the traction means of one such unit having outer edges spaced farther apart than the outer edges of the traction means of the other unit so as to track at least in part on different ground areas, motive power means on the vehicle operatively connected for driving the traction means of both units, articulative coupling means interconnecting the units in tandem relationship including a pivotal connection permitting relative angular motion between the units about an upright axis defined by said pivotal connection and associated structural means effective substantially to prevent relative angular motion between said units, including the traction means thereof, in pitch about a transverse horizontal axis and in roll about a longitudinal axis so as to maintain the ground-engaging tracks of both units substantially in a common plane when traversing uneven terrain, and means to steer said vehicle by directly displacing the units into different relative angular positions about said upright axis comprising force-producing means operatively interconnecting the units to react therebetween at respective locations offset from said upright axis.

2. The vehicle defined in claim 1, wherein the traction means of each unit comprise pairs of endless cleated crawler tracks spaced apart transversely on the respective units.

3. The vehicle defined in claim 2, wherein the steering means comprises cooperable piston and complemental cylinder jack mechanism connected to the front and rear units, and means to selectively apply pressurized fluid to said jack mechanism for operation thereof so as to steer the vehicle.

4. The vehicle defined in claim 3, wherein the spacing between the tracks of the front unit is less than that between the tracks of the rear unit, wherein the front unit has an engine, and wherein power transmission means drivingly connects said engine to both the front unit tracks and the rear unit tracks, such connection to the rear unit tracks including an articulative drive shaft accommodating the aforesaid relative angular motion between the units.

5. The vehicle defined in claim 2, wherein the front and rear units comprise rigid boxlike frame structures and wherein the coupling means interconnecting the units comprise rigid boxlike tongues of generally triangular form in plan and respectively joined to the mutually adjacent ends of the respective boxlike frame structures of said units as rigid endwise continuations thereof, said tongues having apical termini pivotally connected together at top and bottom locations spaced apart vertically to carry load on said coupling means exerted in torque about said transverse and longitudinal axes.

6. The vehicle defined in claim 4, wherein the front and rear units comprise rigid boxlike frame structures and wherein the coupling means interconnecting the units comprise rigid boxlike tongues of generally triangular form in plan and respectively joined to the mutually adjacent ends of the respective boxlike frame structures of said units as rigid endwise continuations thereof, said tongues having apical termini pivotally connected together at top and bottom locations spaced apart vertically to carry load on said coupling means exerted in torque about said transverse and longitudinal axes.

7. The vehicle defined in claim 5, wherein the articulative drive shaft passes endwise of the vehicle at a location between said top and bottom locations.

8. A vehicle for leveling and grooming ski slopes comprising two tandem-connected power-driven track-type units each with ground-engaging surfaces extending substantially linearly along at least the major portion of the length of the associated unit, the relative transverse track locations of which units are such respectively that the tracks of one unit pack snow in paths transversely offset from those packed by the other unit, said units being tandemly interconnected by coupling means so constrained in rigid relationship with the respective structures of said units as to constrain such units, including the tracks thereof, rigidly against appreciable relative angular motion in pitch and in roll while permitting such relative angular motion in yaw, thereby to maintain said tracks in a common ground-engaging plane, and means interconnecting the units to steer the vehicle by forcing relative angular displacement therebetween about said coupling in said common plane.

* * * * *